United States Patent
Lamoureux et al.

(10) Patent No.: US 12,515,501 B2
(45) Date of Patent: Jan. 6, 2026

(54) GLAZING WITH A THIN WINDOW-HOLDER AND METHOD OF MANUFACTURING SAID GLAZING

(71) Applicant: SAINT-GOBAIN GLASS FRANCE, Courbevoie (FR)

(72) Inventors: Laurent Lamoureux, Ribecourt-Dreslincourt (FR); Frédéric Berthe, Cambronne les Ribecourt (FR)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 461 days.

(21) Appl. No.: 18/006,336

(22) PCT Filed: Jul. 9, 2021

(86) PCT No.: PCT/FR2021/051280
§ 371 (c)(1),
(2) Date: Jan. 20, 2023

(87) PCT Pub. No.: WO2022/018348
PCT Pub. Date: Jan. 27, 2022

(65) Prior Publication Data
US 2023/0347624 A1    Nov. 2, 2023

(30) Foreign Application Priority Data
Jul. 24, 2020  (FR) ...................................... 2007803

(51) Int. Cl.
*B32B 17/10*  (2006.01)
*B32B 3/06*  (2006.01)
(Continued)

(52) U.S. Cl.
CPC ................ *B60J 1/17* (2013.01); *B32B 3/06* (2013.01); *B32B 17/10036* (2013.01);
(Continued)

(58) Field of Classification Search
CPC .............. E05F 11/385; E05F 2011/387; B32B 17/10036; B32B 17/10293; B32B 17/1055; B32B 17/10954; B32B 3/06; B60J 1/17
See application file for complete search history.

(56) References Cited

U.S. PATENT DOCUMENTS 5,546,704 A * 8/1996 Maruoka .................... B60J 1/17
49/375
5,992,099 A * 11/1999 Thomas ................ E05F 11/385
49/375
(Continued)

FOREIGN PATENT DOCUMENTS

DE          35 35 719 C1   9/1986
WO    WO 2008/065310 A1   6/2008
(Continued)

OTHER PUBLICATIONS

DR First Office Action as issued in Chinese Patent Application No. 202180004292.4, dated Jun. 7, 2024.
(Continued)

*Primary Examiner* — Justin B Rephann
(74) *Attorney, Agent, or Firm* — Pillsbury Winthrop Shaw Pittman LLP (57) ABSTRACT

A height-adjustable glazing for a vehicle, includes a laminated window including an exterior glass sheet, an interior glass sheet and an interlayer of plastic material located between said exterior and interior glass sheets, the laminated window having an external face intended to be oriented towards an exterior space, an edge and an internal face intended to be oriented towards an interior space, the height-adjustable glazing having a fixing zone wherein a window-holder is fixed to the laminated window, the fixing zone optionally having a fixing hole, wherein the window-holder includes a base plate having an external base face which is
(Continued)

in contact with an internal face of the exterior glass sheet and located in a complementary recess in the plastic interlayer, and at least one cover flange having an external flange face which is in contact with an internal interlayer face of the plastic interlayer.

12 Claims, 6 Drawing Sheets

(51) Int. Cl.
  *B60J 1/17* (2006.01)
  *E05F 11/38* (2006.01)
(52) U.S. Cl.
  CPC .... *B32B 17/10293* (2013.01); *B32B 17/1055* (2013.01); *B32B 17/10954* (2013.01); *E05F 11/385* (2013.01); *B32B 2605/00* (2013.01)

(56) References Cited

U.S. PATENT DOCUMENTS

| | | | | |
|---|---|---|---|---|
| 6,261,672 | B1* | 7/2001 | de Paoli | B32B 17/10366 |
| | | | | 156/303.1 |
| 7,340,861 | B2* | 3/2008 | Jackson, II | B32B 17/10036 |
| | | | | 49/375 |
| 8,904,711 | B2* | 12/2014 | Lopez | B60J 1/007 |
| | | | | 49/374 |
| 8,943,750 | B2* | 2/2015 | Twork, Jr. | E05F 11/385 |
| | | | | 49/352 |
| 12,060,741 | B2* | 8/2024 | Lamoureux | E06B 3/5436 |
| 12,168,335 | B2* | 12/2024 | Maes | B32B 7/12 |
| 12,291,004 | B2* | 5/2025 | Rapenne | B32B 27/08 |
| 2005/0144862 | A1* | 7/2005 | Jackson, II | B32B 17/10293 |
| | | | | 52/204.5 |
| 2018/0178482 | A1* | 6/2018 | Uebelacker | B60J 1/17 |
| 2019/0322161 | A1* | 10/2019 | Uebelacker | B32B 3/266 |
| 2020/0114624 | A1* | 4/2020 | Mannheim Astete | |
| | | | | B32B 17/10036 |
| 2022/0220791 | A1* | 7/2022 | Lamoureux | E05F 11/385 |
| 2023/0130593 | A1* | 4/2023 | Rapenne | B32B 3/08 |
| | | | | 428/435 |
| 2023/0158780 | A1* | 5/2023 | Berthe | B32B 17/10064 |
| | | | | 428/31 |
| 2023/0264455 | A1* | 8/2023 | Mannheim Astete | |
| | | | | B32B 17/10036 |
| | | | | 428/435 |

FOREIGN PATENT DOCUMENTS

| | | |
|---|---|---|
| WO | WO 2014/029605 A1 | 2/2014 |
| WO | WO 2018/178882 A1 | 10/2018 |
| WO | WO 2020/021269 A1 | 1/2020 |
| WO | WO 2021/038214 A1 | 3/2021 |

OTHER PUBLICATIONS

International Search Report as issued in International Patent Application No. PCT/FR2021/051280, dated Oct. 5, 2021.

* cited by examiner

GLAZING WITH A THIN WINDOW-HOLDER AND METHOD OF MANUFACTURING SAID GLAZING

The invention relates to the field of glazings comprising a window and at least one window-holder to allow said window to be moved by translation.

The invention does not relate to the field of glazings where the window is movable by rotation.

The invention is described with respect to a vehicle glazing application comprising a laminated window which in this case comprises an exterior glass sheet, an interior glass sheet and an interlayer of adhesive material located between said two glass sheets, said window having an external face intended to be oriented toward an exterior space, an edge, and an internal face intended to be oriented toward an interior space.

The invention relates more particularly to a glazing comprising at least one window-holder having or not having an axis passing through said window through a hole provided in the window.

The background art knows of a window-holder solution from international patent application No. WO 2008/065310. In this document, the window-holder has an axis passing through the window by a hole, for the passage of a threaded attachment rod. This passage hole is complicated because it consists of two holes of different sizes, each one made in one of the two glass sheets of the laminated window. A washer is placed inside the larger hole and a nut is screwed onto the threaded attachment rod on the larger hole side.

This solution can be improved because in use, the forces applied to the window by the window-holder are likely to damage the lamination. In addition, the compactness, as well as the weight, can be improved (decreased).

The background art also knows from DE 3535719 a window holding system employing a plate and counter-washer presenting a spiral outer surface and three lugs, which is to be screwed into the interior of a partially tubular, three-part feature connected to the plate. This system is intended to allow for tolerance compensation but is not sufficiently reliable because, in the absence of a counterplate, all forces pass through the plate.

The background art furthermore knows from WO 2018/178882 a particular fixing zone: the exterior window is present, as well as the interlayer sheet of adhesive material, but the interior glass sheet is absent.

In the example glazing embodiment shown in FIG. 9A of this document, an insert is fixed to the interior glass sheet by means of the interlayer sheet of adhesive material; the interior glass sheet is not bonded to the insert because a gap is present therebetween. The insert is relatively thin (its thickness is that of the interior glass sheet) and may not be strong enough to reliably attach the glazing to the system intended to move same.

In the example of the glazing shown in FIG. 9B of the document, an insert is fixed to the interior glass sheet by gluing, with a tab of the insert cooperating with the internal face of the interior glass sheet. However, such a tab locally forms an overthickness, a bulge, with respect to the inner sheet, so that the insert according to the example embodiment shown in FIG. 9B has the disadvantage of increasing the size of the glazing.

However, the size of the laminated glazing is an important characteristic for a side glazing given its installation in the constrained space of a motor vehicle door.

Moreover, the size of the glazing is also an important characteristic when interchangeability between a laminated side glazing and a monolithic side glazing is desired by the automaker in order to standardize the connection means and the associated drive device.

The present invention is intended to remedy the disadvantages of the background art and is aimed more particularly and preferentially at a glazing provided with at least one very compact and very light window-holder, which is still very solid and very well fixed and attached to the window.

The present invention is intended to provide a solution by virtue of which the thickness of the glazing in the fixing zone is the same as the thickness of the glazing in the visible part of the glazing, so that there is no overthickness in the fixing zone.

Thus, if a vehicle series has laminated windows for some models and monolithic windows for others, identical connecting means and drive means can be used for both series.

The present invention is also intended to provide a solution for fixing the window-holder "in hidden time" during the lamination process by which the laminated window is formed.

The present invention is intended to provide a particularly compact and reliable solution for a curved window.

To this end, the subject matter of the invention is a vehicle glazing whose height is adjustable according to claim 1. This glazing comprises a laminated window comprising an exterior glass sheet, an interior glass sheet and an interlayer of plastic material located between said two glass sheets, said window having an external face intended to be oriented towards an exterior space, an edge and an internal face intended to be oriented towards an interior space, said glazing having an attachment zone wherein a window-holder is fixed to said window, said attachment zone optionally having a fixing hole.

Said glazing is remarkable in that said window-holder comprises:
  a base plate having an external base face (preferably entirely) in contact with an internal face of said exterior glass sheet and located in a complementary recess in said plastic interlayer, and
  at least one, and preferably two, cover flange(s) having an external flange face which is (preferably entirely) in contact with an internal interlayer face of said plastic interlayer.

For the purposes of the present invention, the term "mounting" or "attachment" signifies mechanical mountings which are attached and detached manually or by means of a mechanical tool. What is attached is thus in a fixed position; hooking, screwing, inserting or clipping are each an attachment. The aforementioned axis of the window-holder is thus an axis of attachment.

"Fixing" within the meaning of the present invention is to be understood as meaning chemical fixings which give rise to molecular changes that are irreversible, unless the connection is broken rendering the window-holder unusable; bonding is one form of fixing.

Each of these two expressions excludes the other.

Preferably, to increase the reliability of the fixing of the window-holder to the window, two overlapping flanges extend laterally, respectively to the left and to the right of said support base (when said window-holder is considered vertically, for use in a vertically positioned glazing).

The support base transmits and distributes directly (without intermediate layer) the stresses of the window-holder to the exterior glass sheet; the cover flange, or each cover flange, allows the window-holder to be fixed to the window via the plastic interlayer. It preferably consists of a single material.

Preferably, in order to make the window-holder particularly compact, said support base has a thickness which is equal to the sum of the thickness of said plastic interlayer and the thickness of said interior glass sheet (the thickness of said plastic interlayer and said interior glass sheet being generally constant).

Preferably, in order to make the window-holder particularly compact, said (or each) cover flange has a thickness that is equal to the thickness of said interior glass sheet.

Preferably, in order to increase the reliability of the attachment of the window-holder to the window, said window-holder comprises a support tab having:
 an outer tab face (preferably entirely) in contact with an internal face of said exterior glass sheet and located in a complementary recess in said plastic interlayer, and
 an inner tab face (preferably entirely) in contact with an external face of said interior glass sheet.

The support tab contributes to the good transmission and distribution, directly (without intermediate layer), of the stresses undergone by the window-holder to the exterior and interior glass sheets.

Thus, said support tab has a thickness that is equal to the thickness of said plastic interlayer.

Said support tab is preferably located above said support base (when said window-holder is considered vertically, for use in a vertically positioned glazing with the window-holder at the bottom).

In a particular embodiment, said support base comprises a hole having an axis that is coaxial with said fixing hole, said hole preferably being laterally (left and right) centered with respect to a width at that location of said support base.

The glazing according to the invention preferably comprises two window-holders.

A further subject matter of the invention is a method of manufacturing a height-adjustable vehicle glazing according to the invention, said glazing comprising a window comprising an exterior glass sheet, an interior glass sheet and a plastic interlayer located between said two glass sheets, said window having an external face intended to be oriented towards an outer space, an edge and an internal face intended to be oriented towards an inner space, said glazing having a fixing zone wherein a window-holder is fixed to said window, said fixing zone optionally having a fixing hole.

Said method is remarkable in that
 an external base face of said support base is applied (preferably entirely) in contact with an internal face of said exterior glass sheet and is positioned in the complementary recess provided in said plastic interlayer, and
 at least one, and preferably two, outer flange face(s) of a cover flange is positioned (preferably entirely) in contact with an inner interlayer face of said plastic interlayer, and then
 a lamination step is carried out to embody said laminated window.

In one embodiment, prior to said lamination step:
 an external tab face of a support tab is applied (preferably entirely) in contact with an internal face of said exterior glass sheet and is positioned in a complementary recess provided in said plastic interlayer, and
 an internal tab face of said support tab is applied (preferably entirely) in contact with an external face of said interior glass sheet.

Advantageously, the present invention thus allows a window-holder to be fixed to a glazing in a reliable, compact manner. A compact attachment and fixing solution allows the height and/or thickness of the window-holder to be reduced, that is, respectively, along the vertical axis Z of the vehicle and along the lateral axis Y of the vehicle for a side glazing; this therefore allows the space required inside the door to be reduced and thus increases the volume available inside the vehicle. This furthermore makes the glazing lighter.

The figures which follow show the invention in a non-limiting manner.

The features shown are to scale with each other in each figure; background features are generally not shown.

Figure 1:
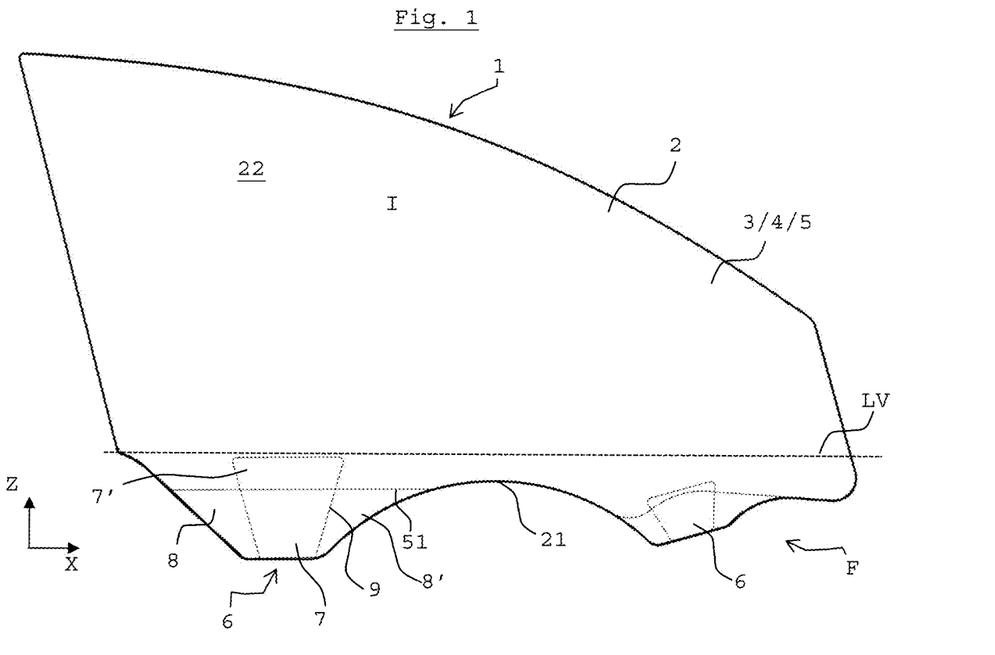
FIG. 1 shows a front view, from the interior, of a first glazing according to the invention, equipped with two window-holders.
Figure 2:
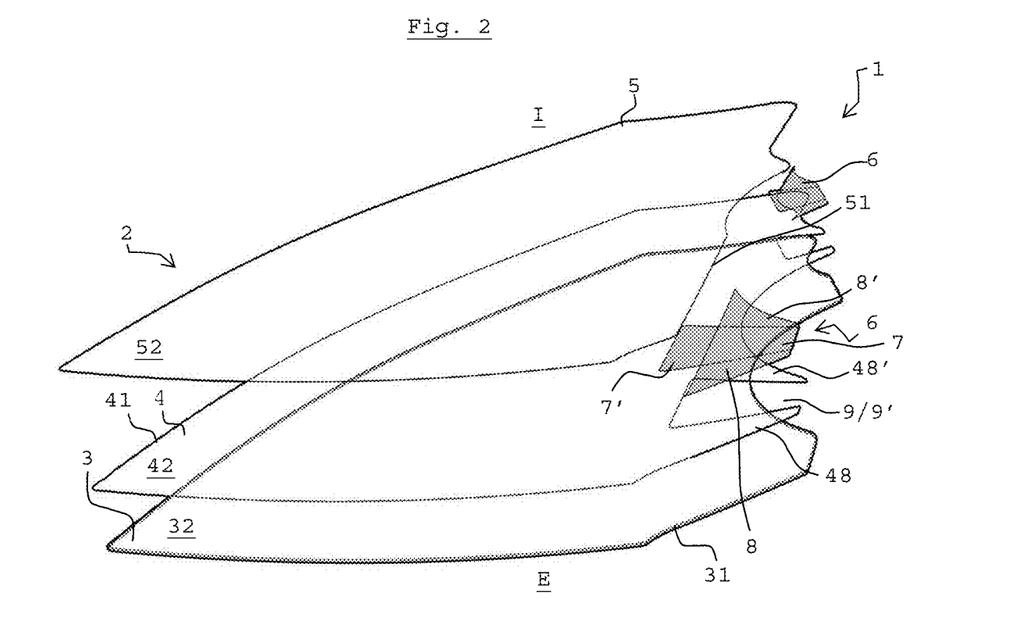
FIG. 2 shows an exploded perspective view of the glazing of FIG. 1.
Figure 3:
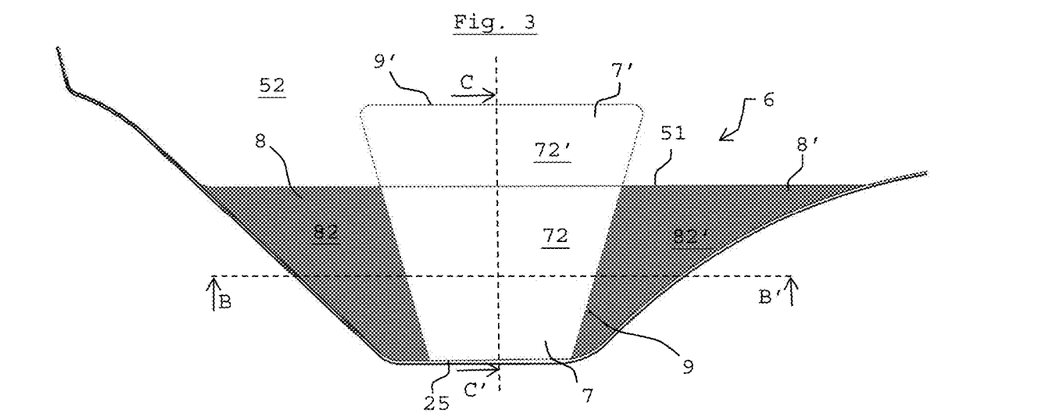
FIG. 3 shows a partial front view, from the interior, of a window-holder of FIG. 1.
Figure 4:
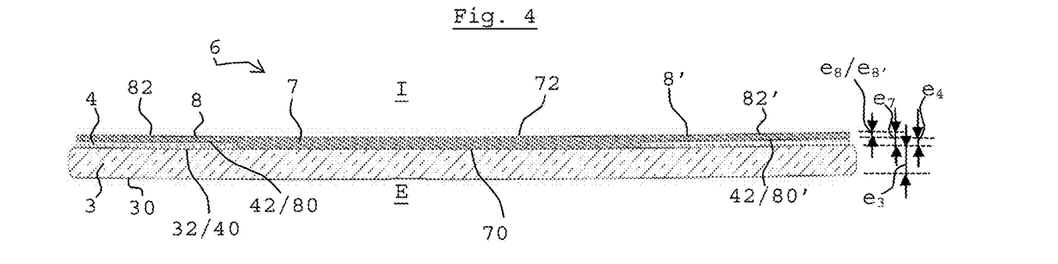
FIG. 4 shows a horizontal cross-sectional view along B-B' of FIG. 3.
Figure 5:
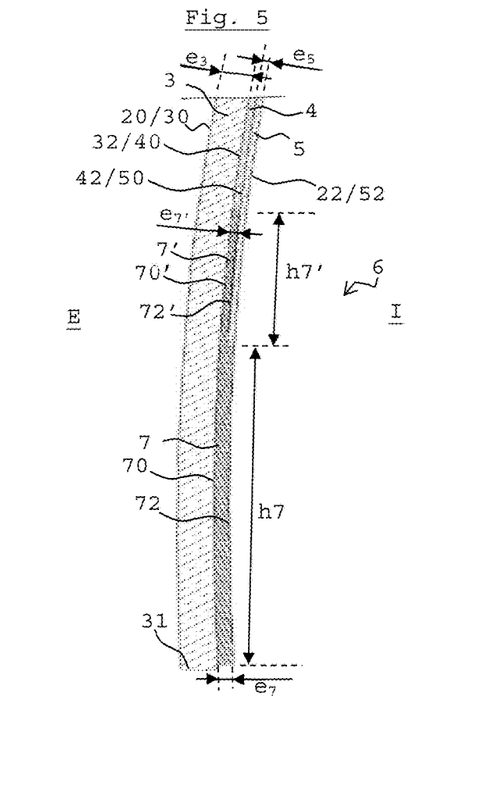
FIG. 5 shows a vertical cross-sectional view along C-C' of FIG. 3.
Figure 8:
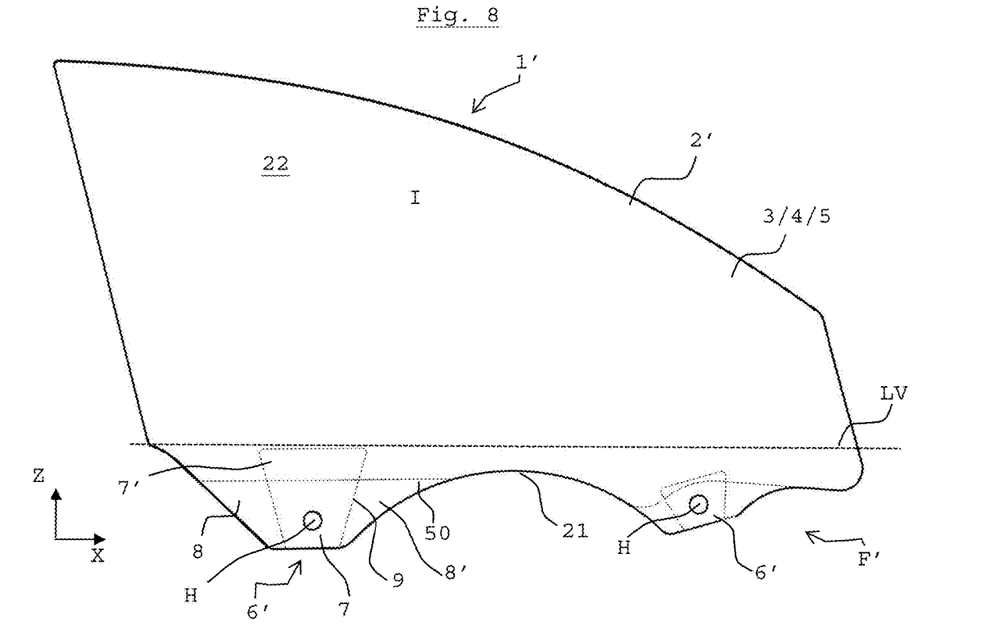
FIG. 8 shows a front view, from the interior, of a second glazing according to the invention, equipped with two window-holders.
Figure 9:
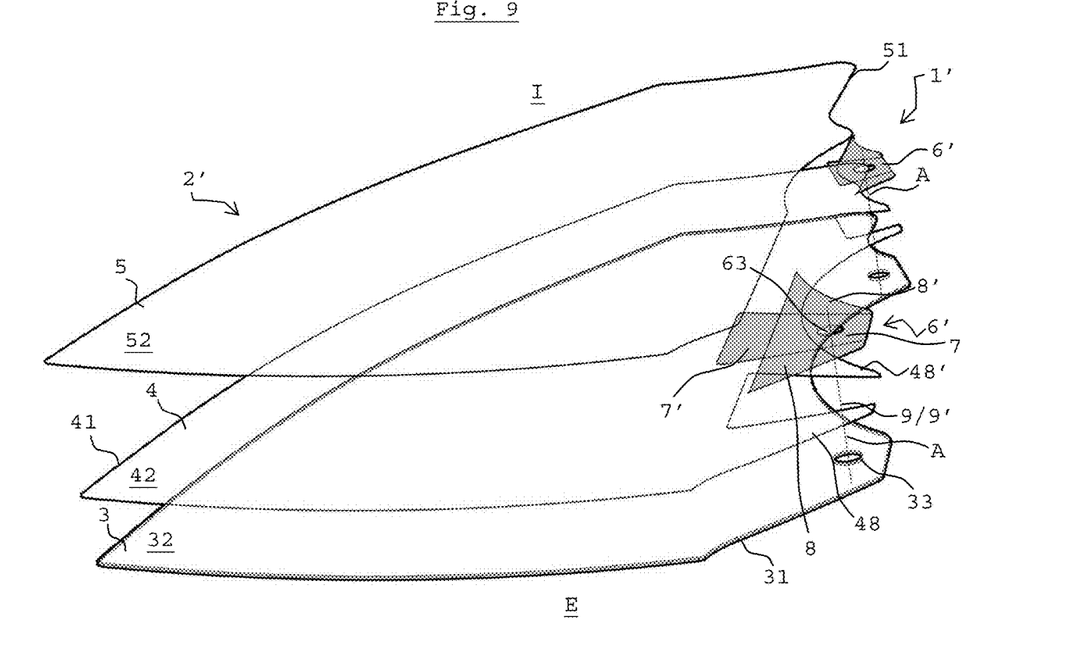
FIG. 9 shows an exploded perspective view of the glazing of FIG. 8.
Figure 10:
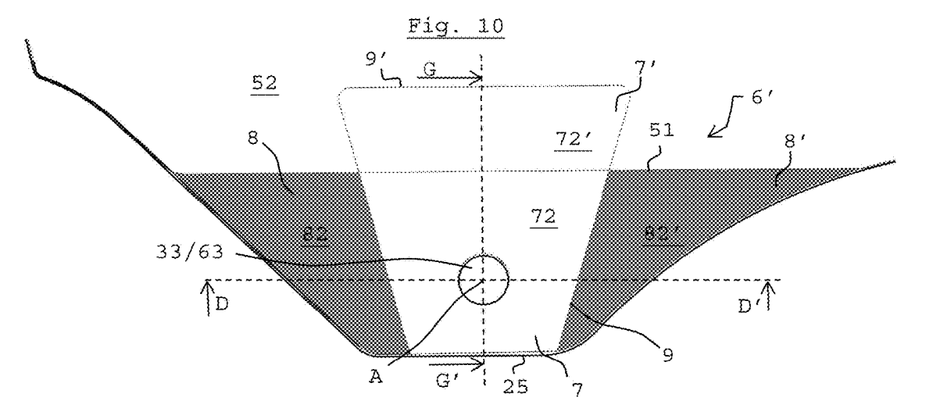
FIG. 10 shows a partial front view, from the interior, of a window-holder of FIG. 8.
Figure 11:
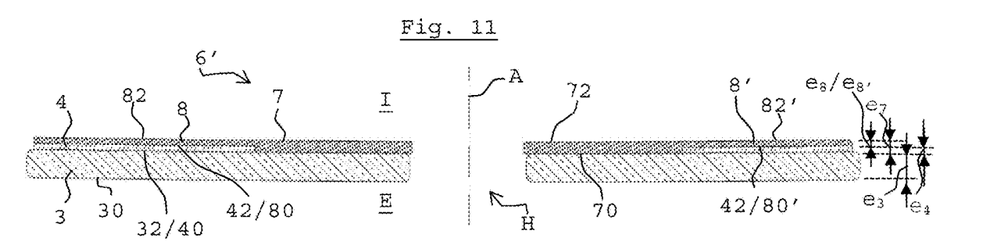
FIG. 11 shows a horizontal cross-sectional view along D-D' of FIG. 10.
Figure 12:
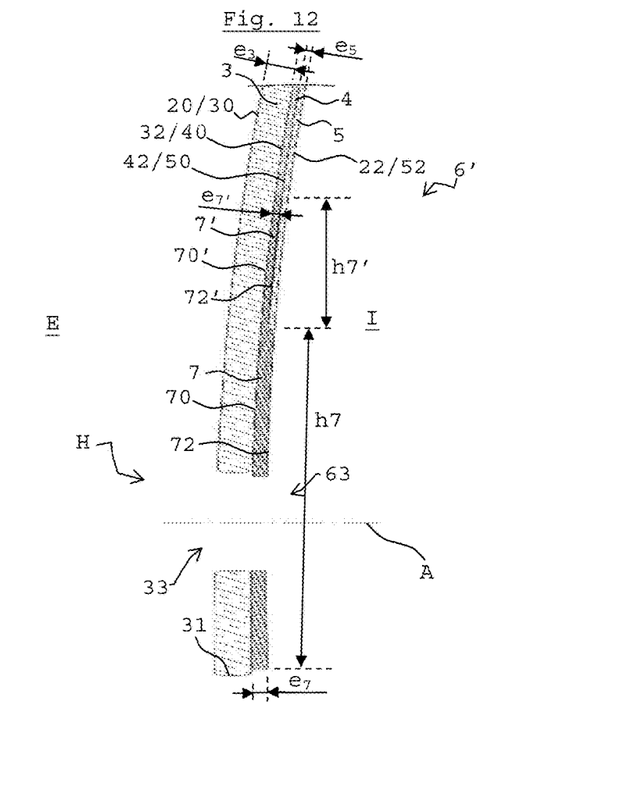
FIG. 12 shows a vertical cross-sectional view along G-G' of FIG. 10.

The present invention relates to a glazing 1, 1', as visible respectively in FIGS. 1 and 8, and in exploded views in FIGS. 2 and 9, comprising a window 2, 2'. The window 2, 2' herein is laminated and comprises an exterior glass sheet 3, an interior glass sheet 5 and an intermediate plastic sheet 4 located between said two glass sheets, and in contact with these two glass sheets.

The present invention is described by way of example in the context of an application as vehicle glazing, that glazing producing a separation between an exterior space E that is outside the vehicle and an interior space I that is inside the vehicle. The ideas of "external face" and "internal face" are therefore considered relative respectively to this exterior space E and this interior space I.

The present invention is described in particular by being applied to a vehicle side glazing and more precisely in the context of an application to a vehicle door side glazing which is movable in height, according to the vertical; FIGS. 1 and 8 being a front view, of the interior space I, of the glazing 1, 1' before its installation in a door.

For the purposes of this document, the notion of verticality is introduced with reference to the vertical axis Z of a vehicle; the forward central horizontal longitudinal axis of the vehicle equipped with the glazing according to the invention as a side glazing being the axis generally referred to as the X-axis of the vehicle, as visible in FIGS. 1 and 8, and the horizontal lateral axis being the Y-axis (not shown).

The glazing 1, 1' is intended to close an opening herein formed in a door of the vehicle, not shown.

The window 2, 2' of the glazing 1, 1' cannot be a monolithic window that consists of a single glass sheet but herein is a laminated window that comprises, from the exterior to the interior and in contact with one another, at least: the exterior glass sheet 3, the plastic interlayer 4 and the interior glass sheet 5; however, it is possible that at least one other sheet be inserted between the exterior glass sheet 3 and the plastic interlayer 4 or between the plastic interlayer 4 and the interior glass sheet 5.

The window 2, 2' preferably consists only of the exterior glass sheet 3, the plastic interlayer 4 and the interior glass sheet 5 in order to be more compact.

The window 2, 2' therefore has an external face 20 oriented toward the exterior space E, an internal face 22 oriented toward the interior space I, and an edge situated between these two faces. Here it is curved.

The exterior glass sheet 3 has an external face 30 which is the same as the external face 20 of the window 2, 2', an internal face 32 oriented towards the plastic interlayer 4, an edge 31 located between these two faces and a thickness $e_3$ which is substantially the same, preferably in the range from 1.60 mm to 3.45 mm, for example 3.45 mm here.

The interior glass sheet 5 has an external face 50 oriented towards the plastic interlayer 4, an internal face 52 which is the same as the internal face 22 of the window 2, 2'; an edge 51 located between these two faces and a thickness $e_5$ which is substantially the same, preferably in the range from 0.70 mm to 1.40 mm, for example 0.70 mm here.

The plastic interlayer 4 has an external interlayer face 40 oriented toward the internal face 32 and is here in contact with that internal face 32, an interior interlayer face 42 oriented toward the external face 50 and which is here in contact with that external face 50, an edge 41 which is situated between these two interlayer faces and a substantially constant thickness $e_4$, for example 0.78 mm. Here it is made of polyvinyl butyral.

The glazing has two parts: an upper part that is visible, and a lower part that is non-visible in the installed state; this lower part is always hidden inside the door, regardless of the state of the glazing (open, closed, or in between). The visibility boundary, which separates the two parts, is materialized by a line LV.

In the visible part of the glazing, the edge of the window thus corresponds to the edge 31 of the exterior glass sheet 3, to the edge 41 of the plastic interlayer 4, and to the edge 51 of the interior glass sheet 5, these three edges herein being substantially in continuity with each other, within 1 millimeter.

In the non-visible part of the glazing, below the line LV, the glazing 1, 1' has a fixing zone F, F' wherein at least one window-holder 6, 6' is respectively fixed to the window 2, 2'.

In this fixing zone, the window 2, 2' is not completely laminated: the three features constituting at least the lamination are not all present on the whole surface of the fixing zone F, F', as detailed below.

The glazing 1, 1' comprises, in addition to the window 2, 2', near one edge (here the lower longitudinal edge), at least one, and preferably two, window-holders 6, 6', supporting the window 2, 2' in the installed state.

This window-holder 6, 6' is intended to accommodate an attachment feature, not shown, which is intended to allow the window-holder to be attached in a movement system for raising and lowering the glazing.

To facilitate the adjustment of the height of the glazing, a second window-holder is preferably positioned in the fixing zone F, F'; the glazing 1, 1', in its configuration of use, thus preferably comprises two window-holders.

Two main variants of the fixing are presented here:
- in a first variant, shown in FIGS. 1 to 7, the fixing zone F has no holes and the window-holders 6 consequently have no holes, and
- in a second variant, shown in FIGS. 8 to 14, the fixing zone F' has two fixing holes H; each of the two window-holders 6 has a fixing hole 63.

Thus, what distinguishes the window-holders 6 from the window-holders 6' is the presence of a fixing hole 63.

In the first variant, the two window-holders 6 are not exactly identical, but they have the same general shape, without any holes; that's why they have the same reference. The window 2 of this first variant does not have a hole.

In the second variant, the two window-holders 6' are not exactly identical, but they have the same general shape, without any holes; that's why they have the same reference. The window 2' of this second variant comprises two holes 33.

Although not shown, it is quite possible for a glazing fixing zone to comprise a window-holder 6 without a hole and a window-holder 6' with a hole.

The window-holders 6, 6' have been grayed out in FIGS. 2 and 9 to facilitate the visualization of their shapes and positions.

The window-holder 6, 6' thus has:
- a support base 7 having an external support face 70, which is oriented towards the exterior space E, an internal support face 72, which is oriented towards the interior space I, an edge situated between these two faces and a thickness $e_7$ which is substantially constant, and
- at least one, and preferably two, cover flange(s) 8, 8' having an external flange face 80 which is oriented towards the exterior space E, an internal flange face 82 which is oriented towards the interior space I, an edge located between these two faces and a thickness $e_8$, $e_{8'}$ which is substantially constant.

Figure 6:
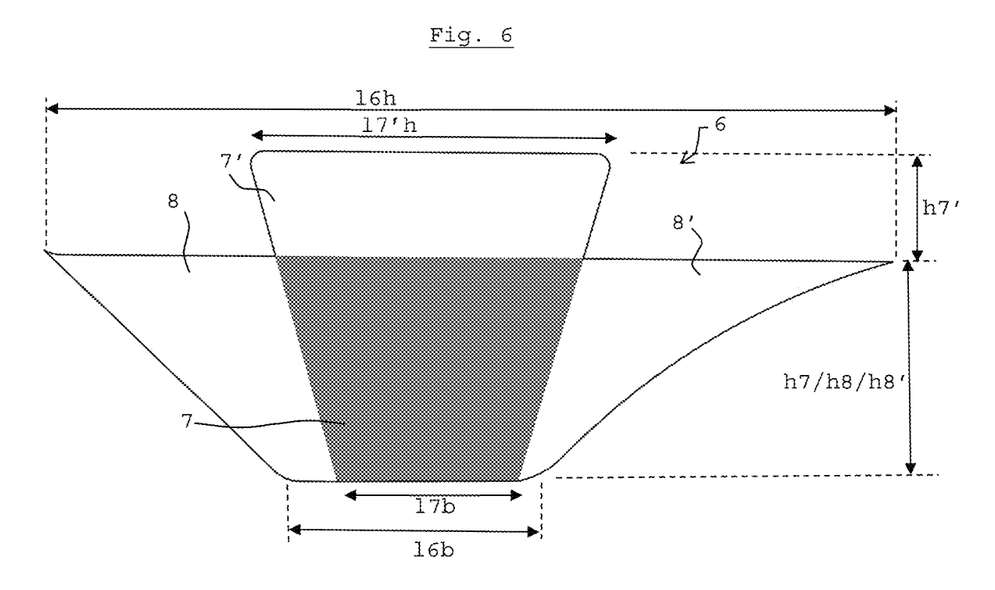
FIG. 6 shows a front view of the window-holder used in FIG. 3.
Figure 7:
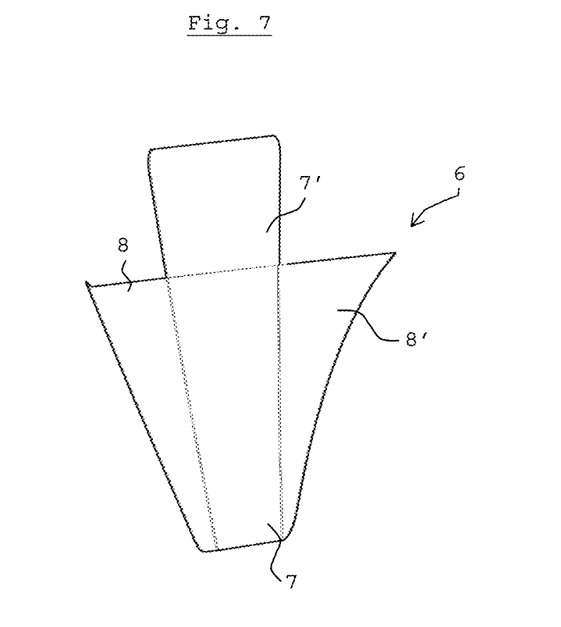
FIG. 7 shows a perspective view of the window-holder used in FIG. 3.
Figure 13:
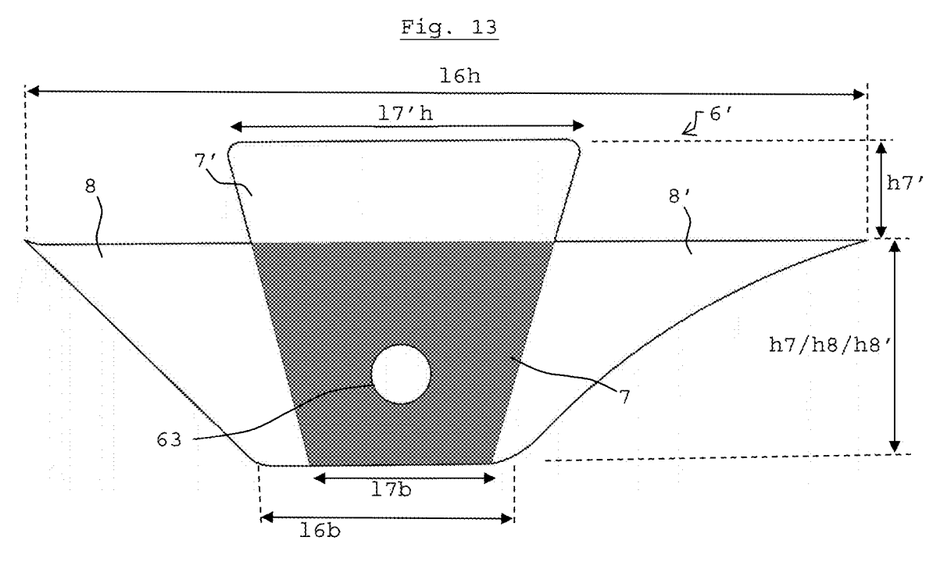
FIG. 13 shows a front view of the window-holder used in FIG. 10.
Figure 14:
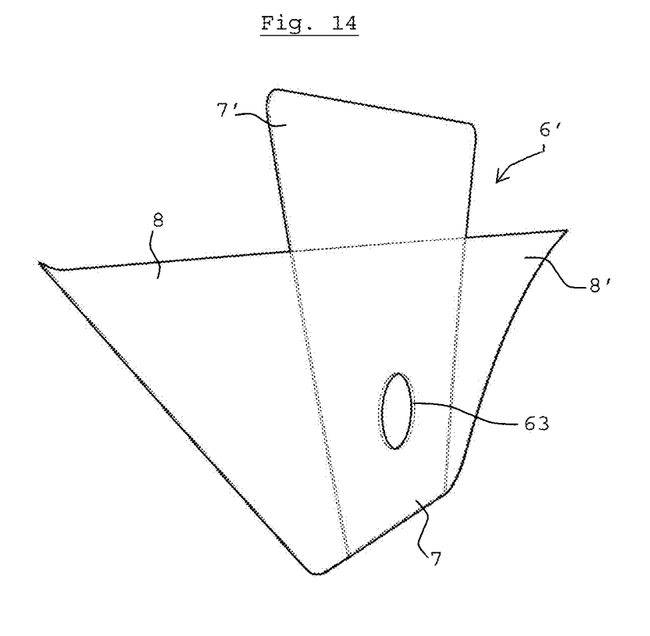
FIG. 14 shows a perspective view of the window-holder used in FIG. 10.

The support base 7 has been grayed out in FIGS. 6 and 13 to facilitate the visualization of its shape and positioning.

The support base 7 is located in a recess 9 which is complementary in shape to the circumference of the support base 7 and which is formed in the plastic interlayer 4. The recess 9 is a removal (an absence) of the plastic interlayer 4 through its entire thickness. On each side of the recess 9, the plastic interlayer 4 is present and forms an advance 48, 48', which goes in the vertical direction, up to a low edge 25 of the window 2, 2'.

The external support face 70 is in full surface contact with the internal face 32 of the exterior glass sheet 3.

The internal support face 72 is in line with the internal face 52 of the interior glass sheet.

The external flange face 80, 80' is in full surface contact with the internal spacer face 42 of the plastic interlayer 4; the cover flange thus rests and adheres to the plastic interlayer 4.

The external support face 82, 82' is in line with the internal face 52 of the interior glass sheet.

The plastic interlayer 4 is therefore present opposite the cover flange 8, 8', and preferably both cover flanges 8, 8', and is absent opposite the support base 7.

The window-holder 6, 6' is thus attached to the window 2, 2' and adheres to the window 2, 2' by means of the cover flange 8, 8' or the cover flanges 8, 8' when there are several of them, which is (are) bonded by the plastic interlayer 4.

The window-holder 6, 6' has two cover flanges 8, 8' which extend laterally, respectively to the left and to the right of the support base 7. These cover flanges 8, 8' have been grayed out in FIGS. 3 and 10 to facilitate the visualization of their shapes and positions.

The base thickness $e_7$ of the support base 7 is equal to the sum of the thickness $e_4$ of the plastic interlayer 4 and the thickness $e_5$ of said interior glass sheet 5.

The flange thicknesses $e_8$, $e_8'$ of the cover flanges 8, 8' are each equal to the thickness $e_5$ of the interior glass sheet 5.

The cover flange 8, 8' (or each cover flange 8, 8') has a height h8, h8' identical to the height of the support base 7. This height corresponds to the distance between the lower end of the edge 51 of the interior glass sheet and the lower edge 25 of the window 2, 2'. Here it is 85 mm.

The width at the bottom, at the narrowest point 17*b* of the support base 7, is 69 mm.

The window-holder 6, 6' furthermore comprises a support tab 7' having an external tab face 70', which is oriented towards the exterior space E, an internal tab face 72, which is oriented towards the interior space, an edge located between these two faces and a substantially constant thickness $e_{7'}$.

The support tab 7' is located in a recess 9' which is complementary in shape to the circumference of the support tab 7' and which is formed in the plastic interlayer 4. The recess 9' is a removal (an absence) of the plastic interlayer 4 through its entire thickness. The recess 9' is in the continuity of the recess 9, above; they form together a single recess.

The external tab face 70' is in full surface contact with the internal face 32 of the exterior glass sheet 3.

The internal tab face 72' is in full surface contact with the internal face 50 of the interior glass sheet 5.

The thickness $e_{7'}$ of the support tab 7' is equal to the thickness $e_4$ of the plastic interlayer 4.

The support tab 7' is located above the support base 7 and is connected to the support base 7. As seen in particular in FIGS. 5 and 12, the support tab 7' is inserted between the exterior glass sheet 3 and the interior glass sheet 5. It participates in the positioning and attachment of the window-holder 6, 6' to the window 2, 2'.

The support tab 7' has a height h7' which is 40 mm and a width at the top, at its widest, 17'*h* of 137 mm.

The window-holder has a total height equal to the sum of the height h7 of the support base 7 and the height h7' of the support tab 7'; here it is 125 mm. The window-holder has a total width 16*h*, equal to the sum of the width of the support base 7 at its widest and the width of the cover flanges 8, 8' at their widest; here it is 324 mm. The window-holder has a minimum width, here at the lowest, 16*b* of 95 mm.

In the second variant, the glazing 1' is intended to be movable in height and the exterior sheet 3 comprises for this purpose at least one tubular hole 33, opening on the two faces of the exterior sheet 3, the external face 30 and the internal face 32. This hole 33 has an axis and has a circular internal cross-section; it does not open onto the edge 31 of the exterior sheet 3: it is thoroughly circular in cross-section and is not a notch.

In this second embodiment, the support base 7 has a hole 63 with an axis that is coaxial with the hole 33 in the exterior glass sheet 3. This hole 63 is here centered with respect to the width of the support base 7 at this location.

The fixing and mechanical attachment of the window-holder 6, 6' to the window 2, 2' is carried out in the following way:
- the external base face 70 of the support base 7 is positioned in the complementary recess 9 provided in the plastic interlayer 4 and is applied fully in contact with the internal face 32 of the exterior glass sheet 3, and
- at least one, and preferably two, outer flange face(s) 80, 80' of the cover flanges 8, 8' is positioned entirely in contact with the inner interlayer face 42 of the plastic interlayer 4, and then
- a lamination step is carried out to embody said laminated window 2, 2'.

In the case where a support tab 7' is present, prior to the lamination:
- the external tab face 70' of the support tab 7' is positioned in the complementary recess 9' provided in the plastic interlayer 4, and is fully applied in contact with the internal face 32 of the exterior glass sheet 3, and
- the interior tab face 72' of the support tab 7' is fully applied in contact with the external face 50 of the interior glass sheet 5.

The window-holder can be made up of two features: the base plate 7 and a cover flange 8, 8'; without any other features.

The window-holder can consist of three features: the base plate 7 and two cover flanges 8, 8', without any other features; or the base plate 7, a cover flange 8, 8' and the support tab 7'.

The window-holder can be made up of four features: the support base 7, two cover flanges 8, 8' and the support tab 7'.

The support base 7 and the cover flange(s) 8, 8' with possibly also the support tab 7' are preferably made of one piece and even more preferably of one material; they are rigid; they can be made of plastic or metal or of a metal alloy. Advantageously, the window-holder embodies an insert; it may be made of a plastic material, particularly polyamide (PA) for example PA 6-6, polyoxymethylene (POM) (also referred to as polyformaldehyde or polyacetal), polybutylene terephthalate (PBT), polyethylene terephthalate (PET); in such a case, it is particularly lightweight and strong. Advantageously, the material of the window-holder has a Shore D hardness that is comprised between 70 and 90.

The window-holder 6, 6' does not comprise any part extending further inward in the interior-exterior orientation than the internal face 52 of the interior glass sheet 5. It comprises no part extending further outward in the interior-exterior orientation than the external face 30 of the exterior glass sheet 3; preferably, it comprises no part extending further outward than the internal face 32 of the exterior glass sheet 3. It comprises no part extending lower in the vertical direction than the edge 31 of the exterior glass sheet 3.

The window-holder 6, 6' is particularly compact; its thickness at its thickest is that of the laminated window at its thickest.

The window-holder 6, 6' is in the general form of a plate arrangement (support base 7, cover flange(s) 8, 8', support tab 7'); these plates are not flat if the window 2, 2' is curved in the fixing zone F, F'; the window-holder 6, 6' is adapted to the curvature of the window 2, 2', if necessary, and this adaptation is notable in that the support base is against the exterior glass sheet.

The invention claimed is:

1. A height-adjustable glazing for a vehicle, comprising a laminated window comprising an exterior glass sheet, an interior glass sheet and an interlayer of plastic material located between said exterior and interior glass sheets, said laminated window having an external face intended to be oriented towards an exterior space, an edge and an internal face intended to be oriented towards an interior space, said height-adjustable glazing having a fixing zone wherein a window-holder is fixed to said laminated window, said fixing zone optionally having a fixing hole, wherein said window-holder comprises:
- a base plate having an external base face which is in contact with an internal face of said exterior glass sheet and located in a complementary recess in said plastic interlayer, and
- at least one cover flange having an external flange face which is in contact with an internal interlayer face of said plastic interlayer.

2. The height-adjustable glazing according to claim 1, wherein two cover flanges extend laterally, respectively to the left and to the right of said base plate.

3. The height-adjustable glazing according to claim 1, wherein said base plate has a base thickness which is equal to a sum of the thickness of said plastic interlayer and a thickness of said interior glass sheet.

4. The height-adjustable glazing according to claim 1, wherein said cover flange has a flange thickness which is equal to a thickness of said interior glass sheet.

5. The height-adjustable glazing according to claim 1, wherein said window-holder comprises a support tab having:
- an external tab face in contact with an internal face of said exterior glass sheet and located in another complementary recess provided in said plastic interlayer, said another complementary recess being complementary in shape to a circumference of the support tab, and
- an internal tab face in contact with an external face of said interior glass sheet.

6. The height-adjustable glazing according to claim 5, wherein said support tab is located above said base plate.

7. The height-adjustable glazing according to claim 1, wherein said base plate comprises a hole having an axis which is coaxial with said fixing hole.

8. The height-adjustable glazing according to claim 7, wherein said hole is laterally centered with respect to a width at that location of said base plate.

9. The height-adjustable glazing according to claim 1, wherein said window-holder comprises at least two cover flanges.

10. A method of manufacturing a height-adjustable glazing of a vehicle according to claim 1, said height-adjustable glazing comprising the laminated window comprising the exterior glass sheet, the interior glass sheet, and the plastic interlayer located between said exterior and interior glass sheets, said laminated window having the external face intended to be oriented towards the exterior space, the edge, and the internal face intended to be oriented towards the interior space, said height-adjustable glazing having the fixing zone wherein the window-holder is fixed to said laminated window, said fixing zone optionally having a fixing hole, the method comprising:
- applying the external base face of said base plate in contact with the internal face of said exterior glass sheet and positioned in the complementary recess provided in said plastic interlayer, and
- positioning the at least one external face of the cover flange in contact with the internal interlayer face of said plastic interlayer, and then
- carrying out a lamination step to embody said laminated window.

11. The method according to claim 10, wherein, prior to said lamination step, the method comprises:
- applying an external tab face of a support tab in contact with an internal face of said exterior glass sheet and positioned in another complementary recess provided in said plastic interlayer, said another complementary recess being complementary in shape to a circumference of the support tab, and
- applying an internal tab face of said support tab in contact with an external face of said interior glass sheet.

12. The method according to claim 10, wherein two external faces are positioned in contact with the internal interlayer face of said plastic interlayer.

* * * * *